G. W. STOIBER.
COMBINED DOOR CHECK AND DOOR CLOSING DEVICE.
APPLICATION FILED JUNE 12, 1919.
1,313,612. Patented Aug. 19, 1919.
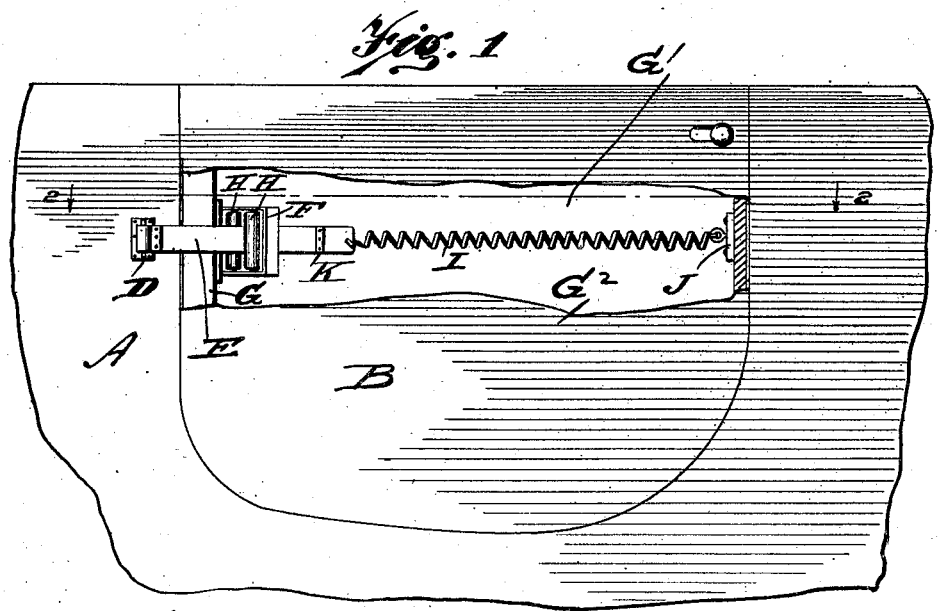
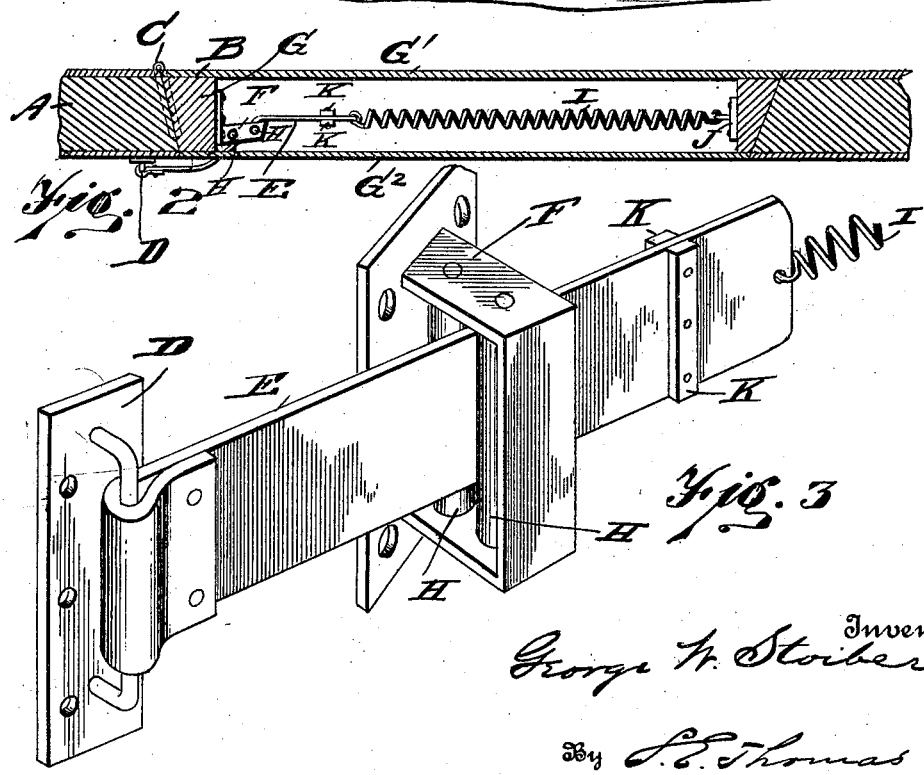
Inventor
George W. Stoiber
By S. E. Thomas
Attorney

UNITED STATES PATENT OFFICE.

GEORGE W. STOIBER, OF DETROIT, MICHIGAN.

COMBINED DOOR-CHECK AND DOOR-CLOSING DEVICE.

1,313,612.   Specification of Letters Patent.   Patented Aug. 19, 1919.

Application filed June 12, 1919. Serial No. 303,738.

*To all whom it may concern:*

Be it known that I, GEORGE W. STOIBER, citizen of the United States, residing at Detroit, county of Wayne, State of Michigan, have invented a certain new and useful Improvement in Combined Door-Check and Door-Closing Devices; and declare the following to be a full, clear, and exact description of the same, such as will enable others skilled in the art to which it pertains to make and use the same, reference being had to the accompanying drawings, which form a part of this specification.

My invention relates to a combined door check and door closing device for vehicles, shown in the accompanying drawings and more particularly pointed out in the following specification and claims.

The object of the present invention is to provide a simple, effective and inexpensive device adapted to automatically close the door of a vehicle that it may not be torn from its hinges through accident.

A further object is to provide a device which is practically concealed within the frame of the door that it may not detract from the finished appearance of the vehicle.

A still further object of the invention is to provide means for limiting the degree to which the door may be "opened" so as to avoid striking the fender or body of the vehicle.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:

Figure 1 is a fragmentary view of the body of a vehicle, showing the door and body as viewed from the inside with a portion of the "buckram cover" of the door removed to show the device installed.

Fig. 2 is a horizontal sectional view on the line 2—2 of Fig. 1.

Fig. 3 is a perspective view of the device.

Referring now to the letters of reference placed upon the drawings:—

A denotes the wall of a vehicle body. B, a door hinged to the body at C. D, indicates a bracket secured to the inner wall of the vehicle to which is secured a short strap or belt E. F, designates a fixture secured to the door frame G, between the outer wall $G'$, and the inner buckram board $G^2$. H, H, indicate anti-friction rollers journaled in the fixture F, spaced apart to receive the strap or belt E.

I, denotes a spring secured at one end to the strap E, its opposite end being connected with a bracket J, secured to the inner face of the door frame.

K, are cleats secured to each side of the strap E, which are so positioned upon the strap that the door may not be opened to a greater extent than warranted by the contact of the cleats with the rollers H, H, when opening the door.

Having indicated the several parts by reference letters, the construction and operation of the device will be readily understood.

The door upon being opened will be automatically closed through the action of the spring I, when released, thereby avoiding any chance of it being torn from its hinges through accident.

The degree to which the door may be opened is determined by the cleats K, contacting with the rollers H, H, therefore there is no chance of the door injuring the finish of the body or fender through contact therewith.

Having thus described my invention, what I claim is:—

1. In a device of the character described, a spring having one end secured to the free end of the door frame, a flexible strap connected with the other end of the spring, means for securing the opposite end of the strap to the inner wall of the body of the vehicle and out of the plane of the door frame, whereby the spring may operate to close the door, and means for guiding said strap from its connection with the inner wall of the body of the vehicle to the plane of the door frame.

2. In a device of the character described, a spring having one end secured to the free end of the door frame between its inner and outer side walls, a flexible strap connected with the other end of the spring projecting through an opening provided in the wall of the door at the hinged side of the latter, a bracket secured to the inner wall of the vehicle to which said flexible strap is connected, and a fixture, comprising anti-friction rollers spaced apart to receive the strap, secured to the door frame adapted to guide said strap from its connection with the bracket attached to the inner wall of the vehicle to the plane of the door frame and between the inner and outer walls of the latter.

3. In a device of the character described, a spring secured at one end to the free end of the door frame and between the inner and outer side walls of the latter, a flexible strap secured to the other end of the spring and extending through an opening provided in the side wall of the door near its hinged connection with the body of the vehicle, a bracket secured to the inner wall of the vehicle body to which the strap is connected, a pair of rollers journaled in a suitable frame spaced apart to receive said strap and adapted to guide the strap from the inner wall of the vehicle between the inner and outer walls of the door, and cleats secured to said strap adapted to limit the opening of the door due to the cleats contacting with said rollers when the door is opened.

In testimony whereof, I sign this specification in the presence of two witnesses.

GEORGE W. STOIBER.

Witnesses:
S. E. THOMAS,
JOHN CONSIDINE, Jr.

Copies of this patent may be obtained for five cents each, by addressing the "Commissioner of Patents, Washington, D. C."